(12) United States Patent
Yao et al.

(10) Patent No.: US 11,703,709 B1
(45) Date of Patent: Jul. 18, 2023

(54) OPTICAL ELEMENT WITH LINEAR POLARIZER

(71) Applicant: Meta Platforms Technologies, LLC, Menlo Park, CA (US)

(72) Inventors: Jianing Yao, San Jose, CA (US); Daozhi Wang, Dublin, CA (US); Silvio Grespan, Santa Clara, CA (US); Weihua Gao, Foothill Ranch, CA (US); Chia-Hsuan Tai, San Jose, CA (US); Shizhe Shen, Foster City, CA (US); John Robert Volk, San Francisco, CA (US); Richard Han Soo Cho, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 26 days.

(21) Appl. No.: 17/165,788

(22) Filed: Feb. 2, 2021

(51) Int. Cl.
*G02F 1/1335* (2006.01)
*G02F 1/13363* (2006.01)

(52) U.S. Cl.
CPC .. *G02F 1/133548* (2021.01); *G02F 1/133541* (2021.01); *G02F 1/133638* (2021.01)

(58) Field of Classification Search
None
See application file for complete search history.

(56) References Cited

U.S. PATENT DOCUMENTS

| | | | |
|---|---|---|---|
| 10,955,672 B1 * | 3/2021 | Wheelwright | G02B 27/286 |
| 2010/0033675 A1 * | 2/2010 | Miyoshi | B29D 11/00634 |
| | | | 264/1.32 |
| 2015/0146294 A1 * | 5/2015 | Watanabe | B32B 33/00 |
| | | | 156/229 |
| 2019/0219754 A1 * | 7/2019 | Seo | C09K 19/542 |

FOREIGN PATENT DOCUMENTS

| | | | | |
|---|---|---|---|---|
| CN | 101836141 A | * | 9/2010 | C09K 19/02 |
| CN | 110655881 A | * | 1/2020 | C09J 11/00 |
| JP | 2016143026 A | * | 8/2016 | G02B 5/3033 |
| TW | 201809749 A | * | 3/2018 | B32B 7/12 |

* cited by examiner

*Primary Examiner* — Phu Vu
(74) *Attorney, Agent, or Firm* — Freestone Intellectual Property Law PLLC; Aaron J. Visbeek (57) ABSTRACT

An optical element includes a linear polarizer layer and a transparent optical layer. The linear polarizer layer includes surfaces waviness and the transparent optical layer smooths the surfaces waves of the linear polarizer layer.

14 Claims, 9 Drawing Sheets

OPTICAL ELEMENT WITH LINEAR POLARIZER

BACKGROUND INFORMATION

Linear polarizers are commonly used in optical elements to filter for polarized light having a particular polarization orientation. Linear polarizers may be absorptive polarizers, for example. In some contexts, it is important that the optical quality of an optical element is not adversely impacted by including a linear polarizer.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an improved optical element having a linear polarizer are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm.

In aspects of this disclosure, the term "transparent" may be defined as having greater than 90% transmission of light. In some aspects, the term "transparent" may be defined as a material having greater than 90% transmission of visible light.

The optical elements that are described in this disclosure improve the optical quality of optical elements that include linear polarizers. Conventional linear polarizers have thickness variations that manifests as surface waviness (sometimes referred to as "orange peel") on the surface of the linear polarizer. When additional optical layers are stacked over the surface waviness, the surface waviness can translate through the optical layers and consequently negatively impact the optical quality of a multi-layer optical element that includes a linear polarizer. The degradation of optical quality of an optical element may be particularly noticeable in near-eye optical elements, especially when the near-eye optical element includes a reflective layer such as a mirror or reflective polarizer.

In an embodiment, a transparent optical layer (e.g. glass or plastic) is disposed on the linear polarizer with a suitable thickness to smooth the surface waviness of the linear polarizer so that the surface waviness (orange peel) does not translate through to the other layers in the optical element. In one embodiment, a transparent optical layer (e.g. glass or plastic) is disposed on a reflective polarizer layer so that the reflective polarizer layer is disposed between the transparent optical layer and the linear polarizer. In this embodiment, the transparent optical layer smooths out the surface waviness of the reflective polarizer layer that was translated to the reflective polarizer layer from the reflective polarizer layer being disposed on the linear polarizer layer. In another embodiment, a direct-coated linear polarizer having self-aligning liquid crystals is used in an optical element instead of a conventional linear polarizer. The direct-coated linear polarizer does not have the thickness variation of a conventional linear polarizer and thus the surface waviness (orange peel) is significantly reduced or even eliminated. These and other embodiments are described in more detail in connection with FIGS. 1A-5.

Figure 1A:
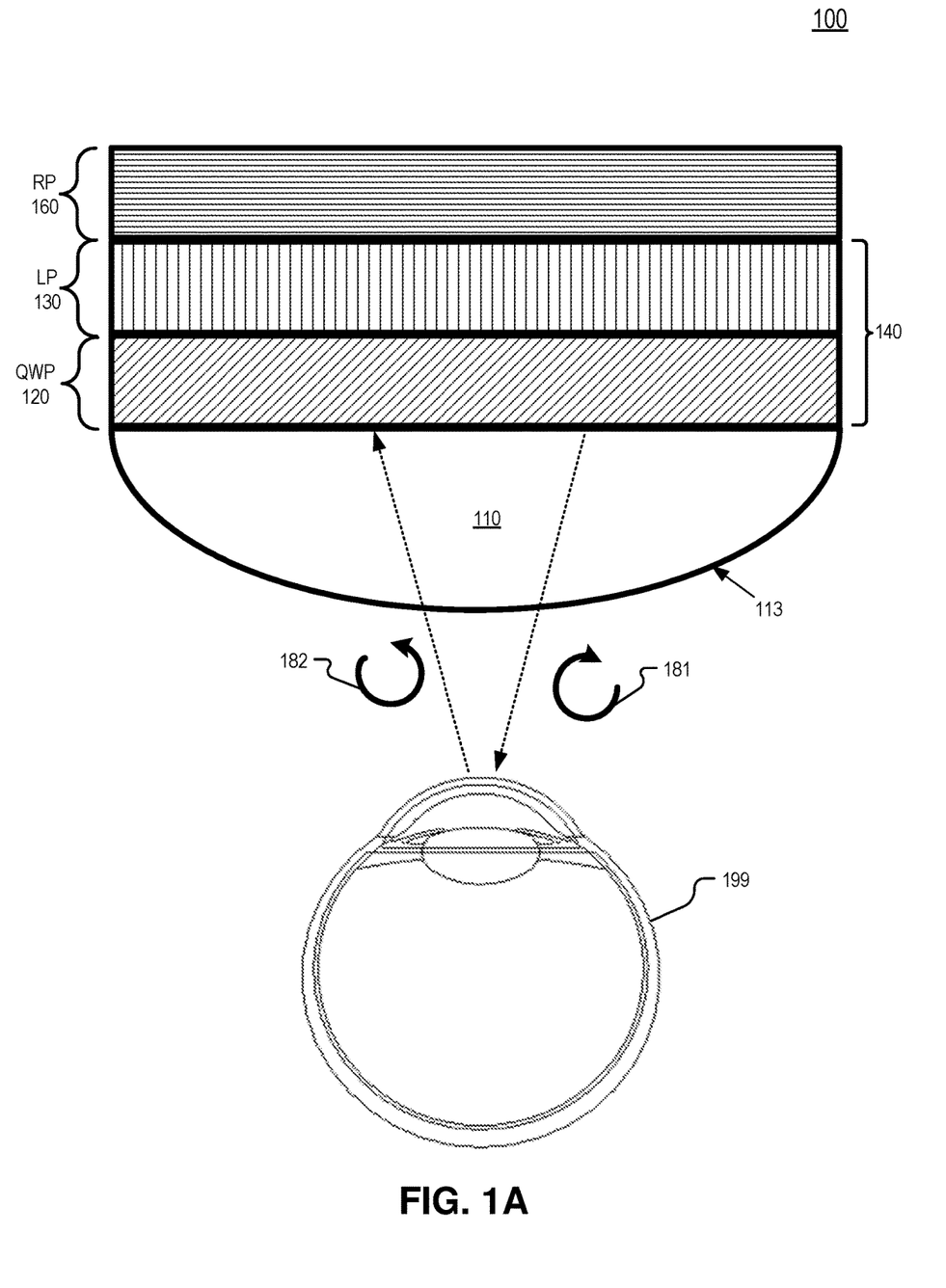
FIG. 1A illustrates an optical element including a refractive lens layer, a lens surface, a quarter-waveplate, a linear polarizer layer, and a reflective polarizer layer.

FIG. 1A illustrates an optical element 100 including a refractive lens layer 110, a lens surface 113, a quarter-waveplate (QWP) 120, a linear polarizer layer 130, and a reflective polarizer layer 160. Refractive lens layer 110 is made of a refractive material such as glass or plastic and includes lens surface 113 having optical power. Lens surface 113 may be coated with an anti-reflective (AR) coating, in some implementations. Lens surface 113 may be a spherical, aspherical, or freeform lens surface.

Reflective polarizer layer 160 includes a reflective polarizer film. Reflective polarizers are a commonly available optical layer that are used in liquid crystal displays (LCDs), for example. Reflective polarizer layer 160 reflects light having a first linear polarization orientation and passes (transmits) a second linear polarization orientation that is orthogonal to the first linear polarization orientation. For example, reflective polarizer layer 160 may reflect p-polarized light and pass s-polarized light. Of course, reflective polarizer layer 160 may be configured to pass p-polarized light and reflect s-polarized light, in certain contexts.

QWP 120 is configured to introduce a relative phase shift of $\pi/2$ (90 degrees) between the orthogonal fast and slow axis of the waveplate. Therefore, incident linearly polarized light may be converted to circularly polarized light by QWP 120 if the slow (or fast) axis of the QWP is oriented at 45 degrees from the polarization axis of the incident light. Likewise, incident circularly polarized light may be converted to linearly polarized light by QWP 120. QWP 120 may be made of birefringent materials such as quartz, organic material sheets, or liquid crystal, for example. In one embodiment, QWP 120 may be designed to be a so-called "zero order waveplate" so that the retardance imparted by the QWP 120 remains close to a quarter of a wave independent of the wavelength and angle of incidence of incoming light.

QWP 120 and linear polarizer 130 may form a so-called "Narcissus filter" when lens 100 is utilized in a near-eye optical context to focus display light for an eye of a user of a near-eye optical system such as an augmented reality (AR), virtual reality (VR), or Mixed Reality (MR) headset. Inevitably, a portion of display light directed to an eye 199 is reflected back (e.g. by the cornea of eye 199) toward lens 100 and ultimately reflected back to eye 199 by lens 100, which may manifest as a faint image of the user's own eye (the user sees a reflection of their own eye). To prevent the user from seeing the faint reflected image of their own eye (and/or prevent specular reflection from the user's eye being reflected back to lens 100), Narcissus filter 140, changes the polarization orientation of the reflected display light to be absorbed by linear polarizer 130 to prevent a reflection of the reflected display light from reflective polarizer 160.

In a particular illustrated example, display light 181 has a right-hand circular (RHC) polarized orientation. The RHC polarization orientation display light 181 that encounters eye 199 is reflected as left-hand circular (LHC) polarized light 182. The LHC polarized light 182 reflected by eye 199 propagates through refractive lens layer 110 and encounters QWP 120. QWP 120 converts the LHC polarized light 182 to s-polarized light and the s-polarized light is absorbed by linear polarizer 130 where linear polarizer 130 is configured to absorb s-polarized light and transmit p-polarized light. Of course, in different examples, different polarization schemes may be utilized where the display light encounters eye 199 in an LHP polarization orientation and linear polarizer 130 is configured to absorb p-polarized light and transmit s-polarized light. In this way, a large portion of reflected display light is absorbed by Narcissus filter 140 so that the reflected display light does not result in the user seeing a reflection of their own eye and/or prevent environmental light from being reflected into lens 100.

Linear polarizers such as linear polarizer layer 130 are often applied through lamination on a flat surface (e.g. surface of QWP 120). Linear polarizers may also be overmolded onto a curved lens surface. Thickness variations and surface waviness of a linear polarizer may propagate throughout an optical element to other surfaces of the optical element (e.g. reflective polarizer layer 160) and ultimately degrades the optical quality of the optical element.

Figure 1B:
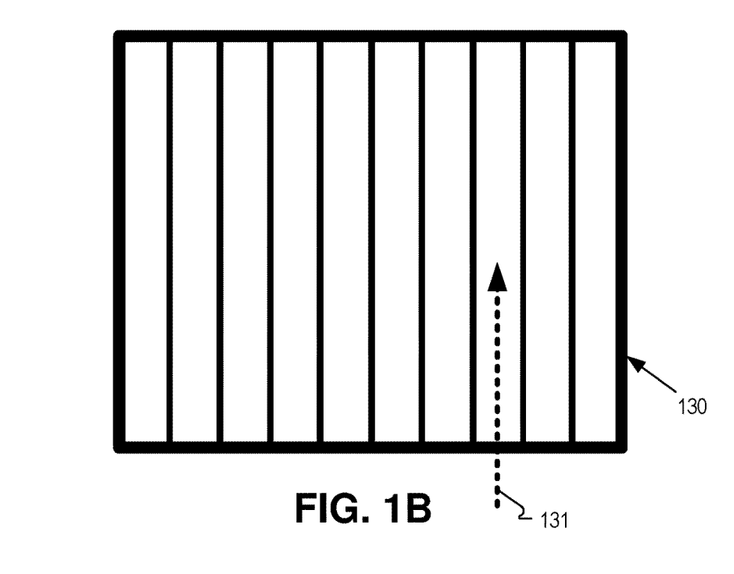
FIG. 1B illustrates a top view of a linear polarizer layer.

FIG. 1B illustrates a top view of a linear polarizer layer 130. Linear polarizer layer 130 includes a polarization axis 131. Polarization axis 131 may be an absorption axis of linear polarizer layer 130. For example, polarization axis 131 may be configured to absorb a particular linear polarization orientation of light (e.g. s-polarized light or p-polarized light).

Figure 1C:
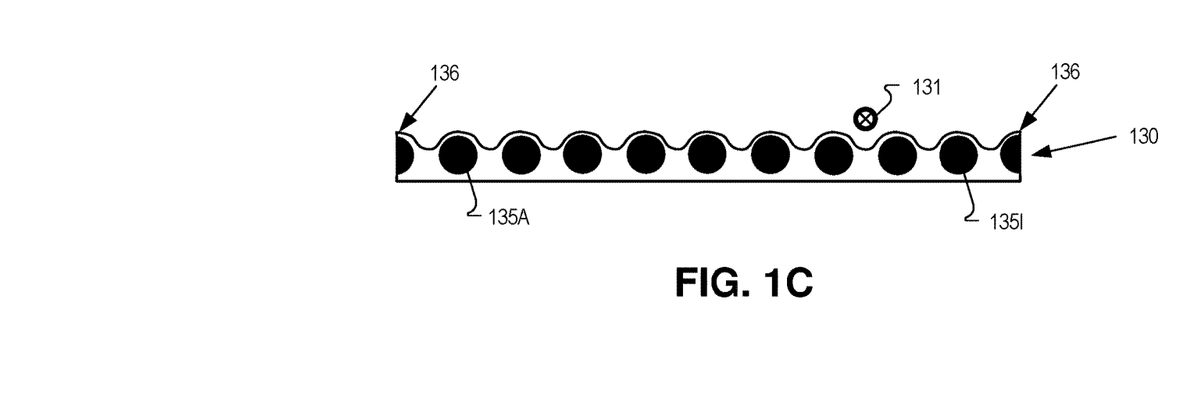
FIG. 1C illustrates a zoomed-in side view of a linear polarizer layer having a polarization axis.

FIG. 1C illustrates a zoomed-in side view of linear polarizer layer 130 where polarization axis 131 is running into the page. FIG. 1C shows that wire-grid elements 135A through 135I (collectively referred to as wire-grid elements 135) may define the polarization axis 131 of linear polarizer layer 130. In FIG. 1C, the polarization axis 131 is parallel to the wire-grid elements 135. Wire-grid elements 135 may also be known as "wires." Other conventional linear polarizer (e.g. polyvinyl alcohol linear polarizers) may utilize designs other than wire-grid designs to generate linear polarizers, but those other designs (e.g. multi-layer constructive/deconstructive interference architectures) also have surface waviness due to thickness variations corresponding to a polarization axis. FIG. 1C shows linear polarizer layer 130 has surface waviness 136.

To smooth the surface waviness 136 of the linear polarizer layer 130, a transparent optical layer (e.g. glass or plastic) can be disposed over the linear polarizer layer 130 to smooth the surface waviness 136 of the linear polarizer layer 130.

Figure 1D:
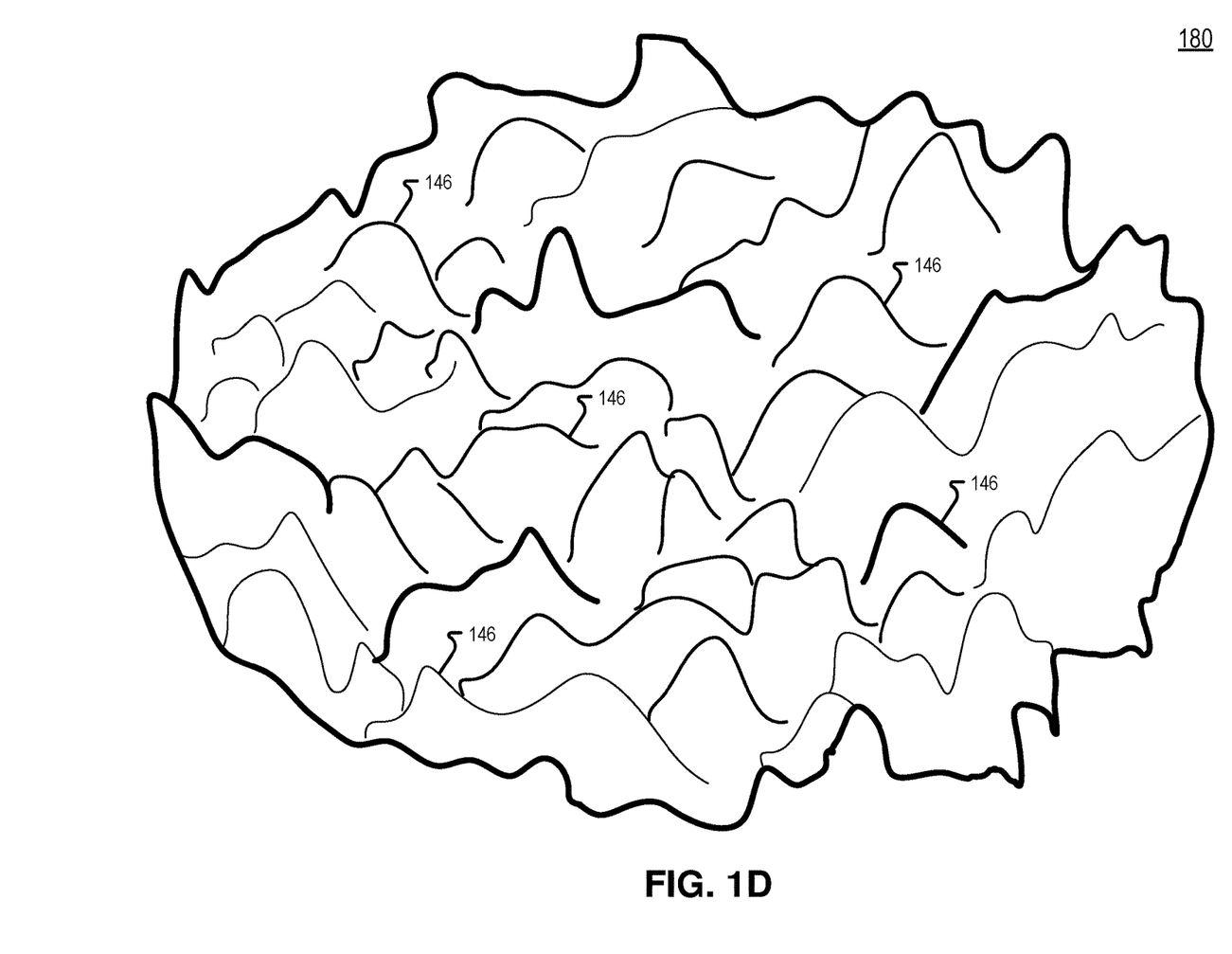
FIG. 1D illustrate a perspective view of an example linear polarizer having surface waviness, in accordance with aspects of the disclosure.

FIG. 1D illustrate a perspective view of an example linear polarizer layer 180 having surface waviness 146, in accordance with aspects of the disclosure. Surface waviness 146 in FIG. 1D may be a more realistic illustration of "orange peel" associate with polyvinyl alcohol (PVA) linear polarizers.

Figure 1E:
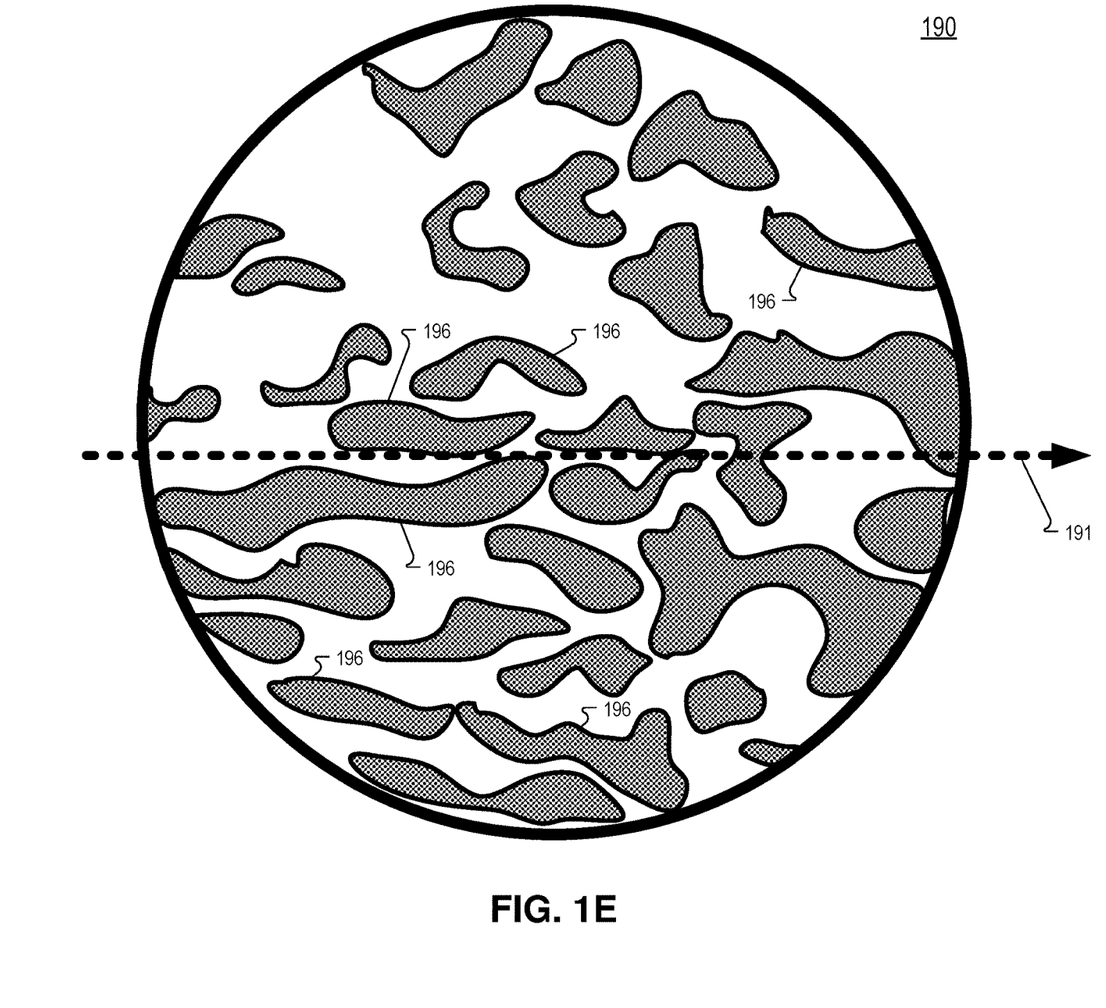
FIG. 1E illustrates a top view of an example linear polarizer layer having orange peel features aligned along an absorption axis of the linear polarizer, in accordance with aspects of the disclosure.

FIG. 1E illustrates a top view of an example linear polarizer layer 190 having orange peel features 196 aligned along an absorption axis of the linear polarizer, in accordance with aspects of the disclosure. FIG. 1E includes a plurality of raised orange peel features 196 of linear polarizer layer 190. Notably, the raised orange peel features 196 are dominantly aligned along the absorption axis 191 of the example linear polarizer layer 190. In other words, to the extent that an orange peel feature 196 is oblong, the longer ends tend to align lengthwise with the absorption axis 191 of example linear polarizer layer 190.

Figure 2A:
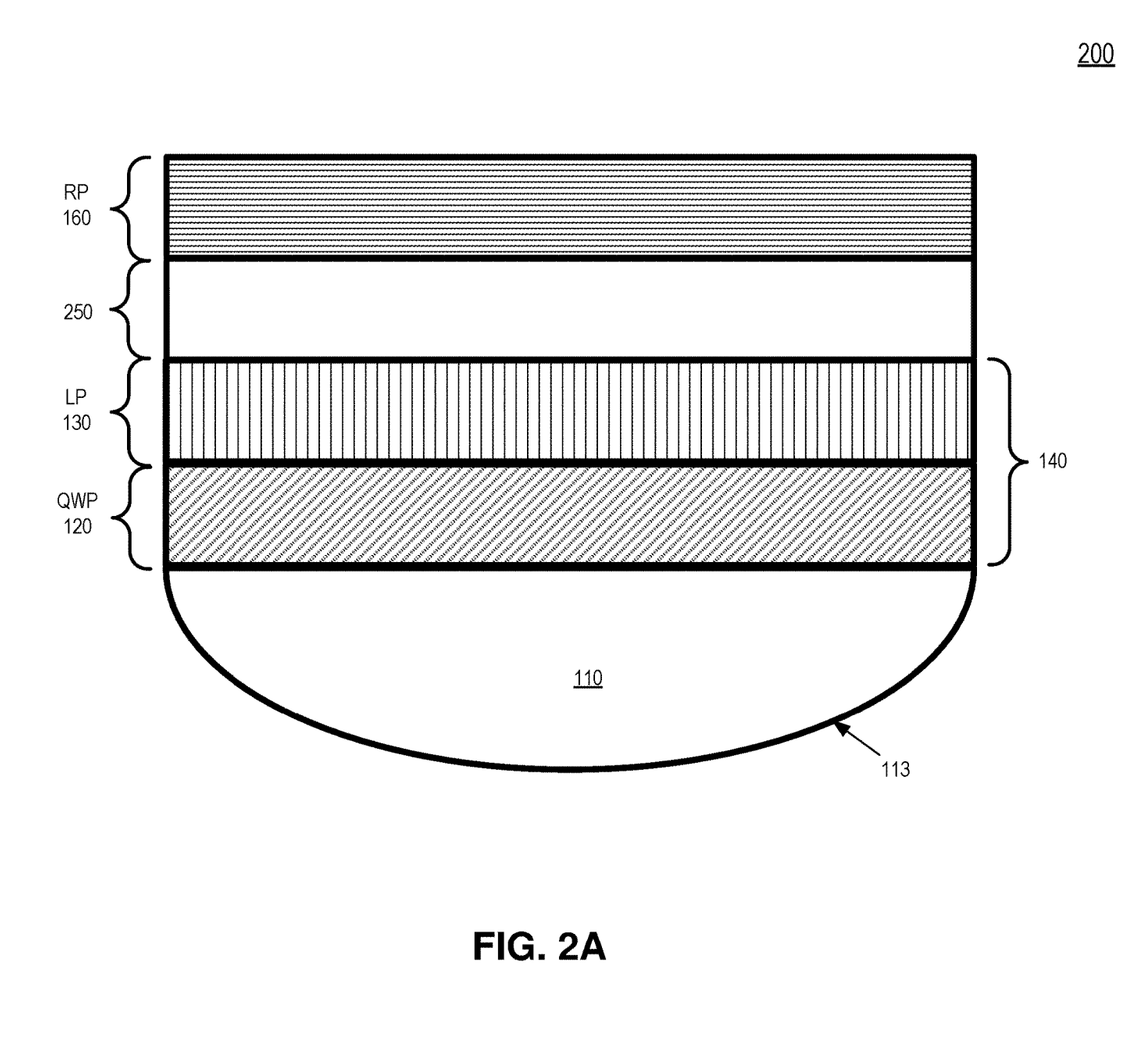
FIG. 2A illustrates a transparent optical layer disposed between a reflective polarizer layer and a linear polarizer layer, in accordance with aspects of the disclosure.

In FIG. 2A, a transparent optical layer is disposed between reflective polarizer layer 160 and linear polarizer layer 130, in example optical element 200. Transparent optical layer 250 may be disposed directly on linear polarizer layer 130. Transparent optical layer 250 may contact linear polarizer layer 130 and reflective polarizer layer 160. An optically clear adhesive may bond transparent optical layer 250 to linear polarizer layer 130 and reflective polarizer layer 160. Transparent optical layer 250 may be a glass film or a plastic film having a thickness sufficient to smooth the surface waviness of the linear polarizer layer. Transparent optical layer 250 may include borosilicate glass. Transparent optical layer 250 may be index-matched to a refractive index of refractive lens layer 110.

Figure 2B:
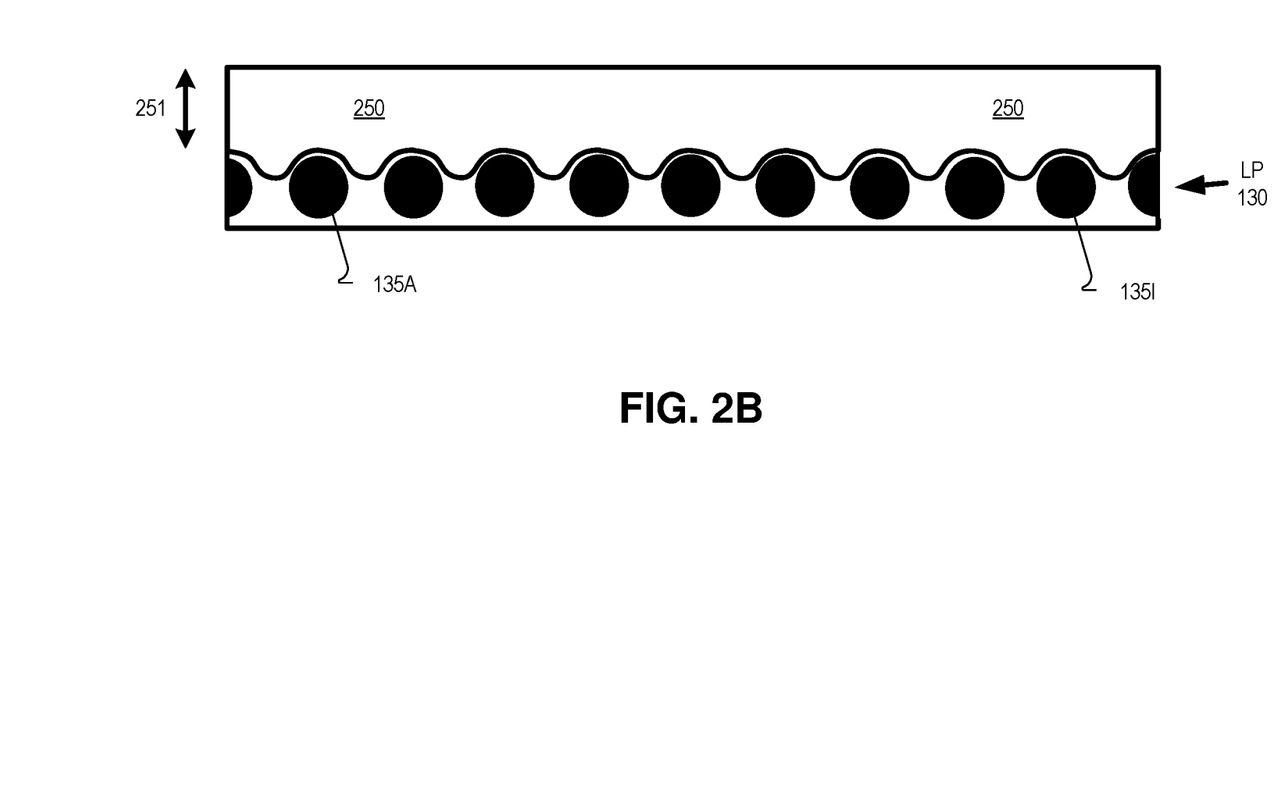
FIG. 2B illustrates an example transparent optical layer disposed on a linear polarizer layer, in accordance with aspects of the disclosure.

FIG. 2B illustrates an example implementation where transparent optical layer 250 is disposed on linear polarizer layer 130. In some implementations, an optical clear adhesive may bond linear polarizer layer 130 to transparent optical layer 250. Transparent optical layer may have a thickness 251 of 100 microns or greater. When a plastic (e.g.

polycarbonate) is used as transparent optical layer 250, thickness 251 may be more than 100 microns to sufficiently smooth the surface waviness 136 of linear polarizer layer 130. The rigidity of the transparent optical layer 250 increases as thickness 251 increases and increased thickness 251 may contributed to a smoother surface and corresponding optical quality. In an implementation, transparent optical layer 250 is a plastic film having a thickness 251 of 300 microns or greater.

Figure 3:
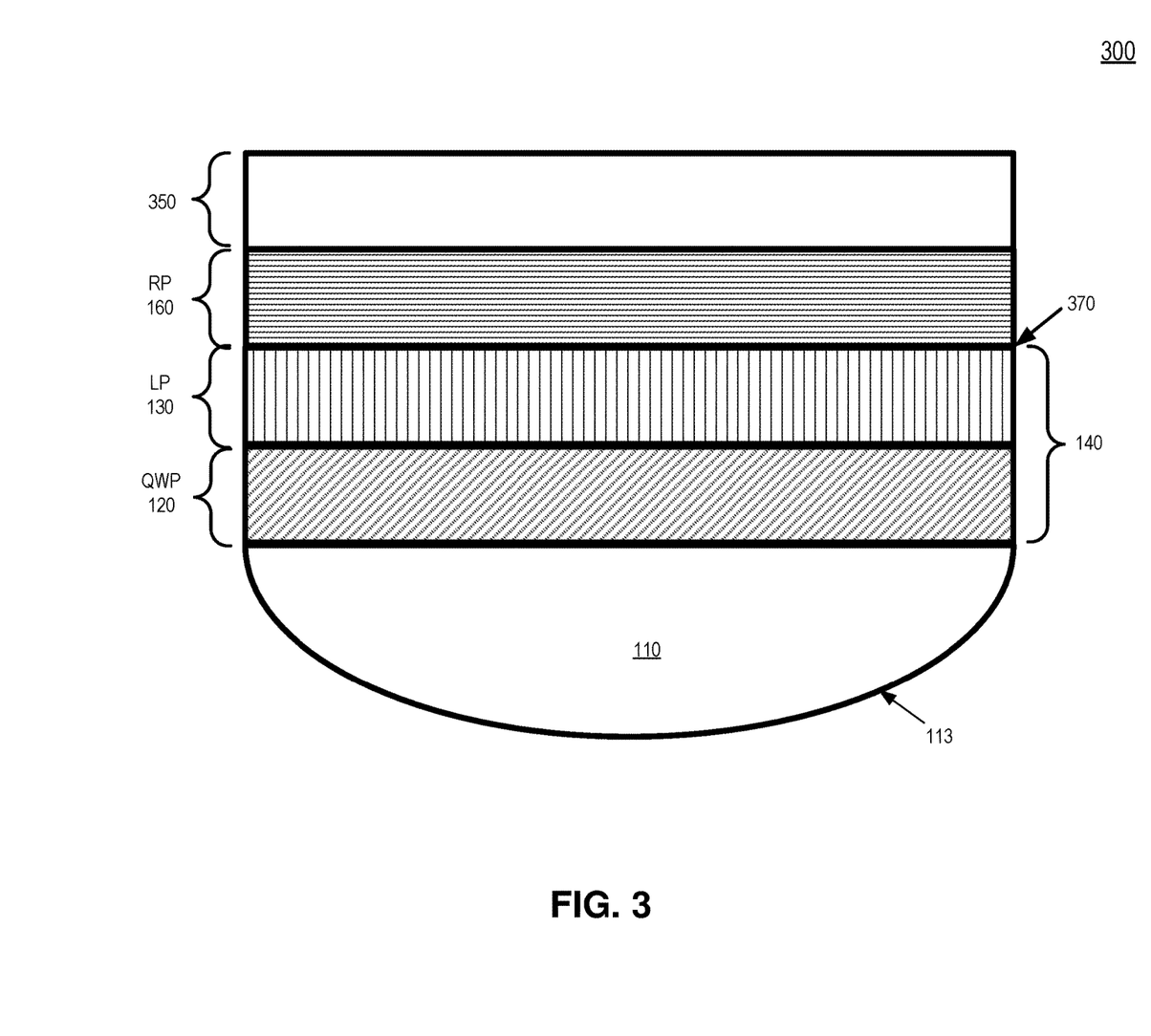
FIG. 3 illustrates an example optical element where a transparent optical layer is disposed over a linear polarizer layer to smooth the surface waviness of the linear polarizer layer, in accordance with aspects of the disclosure.

FIG. 3 illustrates example optical element 300 where a transparent optical layer 350 is disposed over linear polarizer layer 130 to smooth the surface waviness of the linear polarizer layer 130 that may have translated into reflective polarizer layer 160. As described previously, surface waviness 136 of linear polarizer layer 130 may propagate through other optical elements such as reflective polarizer layer 160 that is disposed on linear polarizer layer 130, which may cause surface waviness at the surface of reflective polarizer layer 160. In some implementations, an intermediate layer 370 (e.g. optically clear adhesive) is used to bond reflective polarizer layer 160 to linear polarizer layer 130. Where intermediate layer 370 is an optically clear adhesive, the optically clear adhesive may be index-matched to refractive lens layer 110, in the implementation of FIG. 3.

Transparent optical layer 350 may have similar attributes as described with respect to transparent optical layer 250. Transparent optical layer 350 may be index-matched to refractive lens layer 110, in some implementations.

Figure 4:
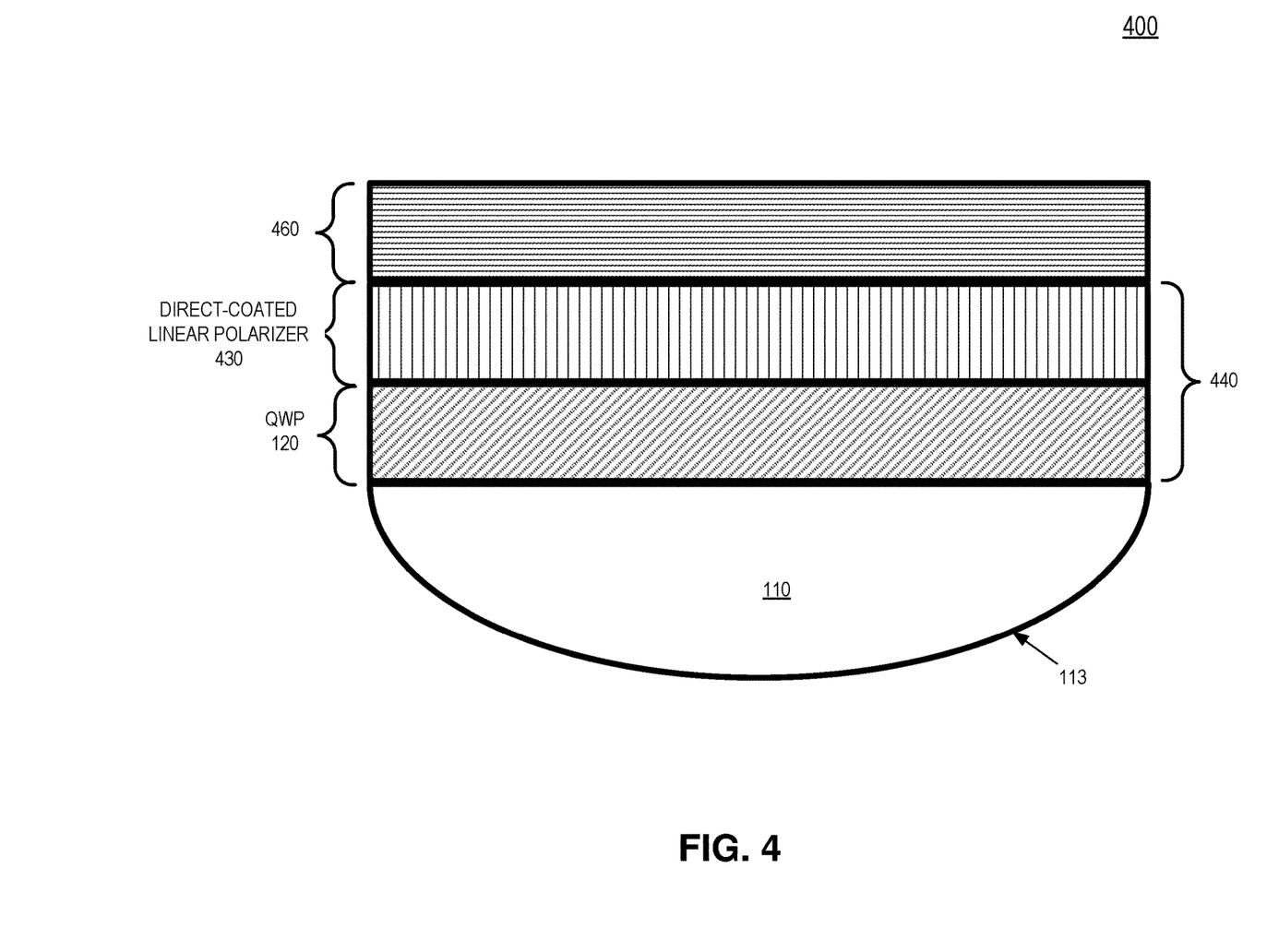
FIG. 4 illustrates an optical element that includes a direct-coated linear polarizer having self-aligning liquid crystals forming a polarization axis of the direct-coated linear polarizer, in accordance with aspects of the disclosure.

FIG. 4 illustrates an optical element 400 that includes a direct-coated linear polarizer 430 having self-aligning liquid crystals forming a polarization axis of the direct-coated linear polarizer 430. Direct-coated linear polarizer 430 is disposed between QWP 120 and reflective layer 460, in FIG. 4. Conventional linear polarizer fabrication techniques typically includes a stretching process to align polymer chains for iodine dopants to attach and thereby forming a light-absorbing axis along the stretching direction. This stretching process is one cause of surface waviness (a.k.a. "orange peel") in linear polarizers. Direct-coated linear polarizers are new linear polarizers that are fabricated without a stretching process that introduces surface waviness in the linear polarizer. Rather, a direct-coating technique using self-aligning liquid crystals is employed. In an example direct-coating process, a sheer-coating of lyotropic liquid crystal solution of PP01 polymer may be used to form an aligned polymer coating. Then, a doping process allows for diffusion of chromophores into the polymer layer and the chromophores align to form the linear polarization features. The direct-coated linear polarizer is used in optical element 400 to form Narcissus filter 440 (along with QWP 120), in FIG. 4. Replacing the conventional linear polarizer 130 with direct-coated linear polarizer 430 in the particular implementation of FIG. 4 reduces or eliminates surface waviness from the linear polarizer from translating into orange peel in reflective layer 460. Reflective layer 460 may be a mirror, a partial mirror (e.g. 50/50 beam splitter), or a reflective polarizer, for example. FIG. 4 shows that in some implementations, optical element 400 includes refractive lens layer 110 and QWP 120 is disposed between direct-coated linear polarizer 430 and refractive lens layer 110.

Figure 5:
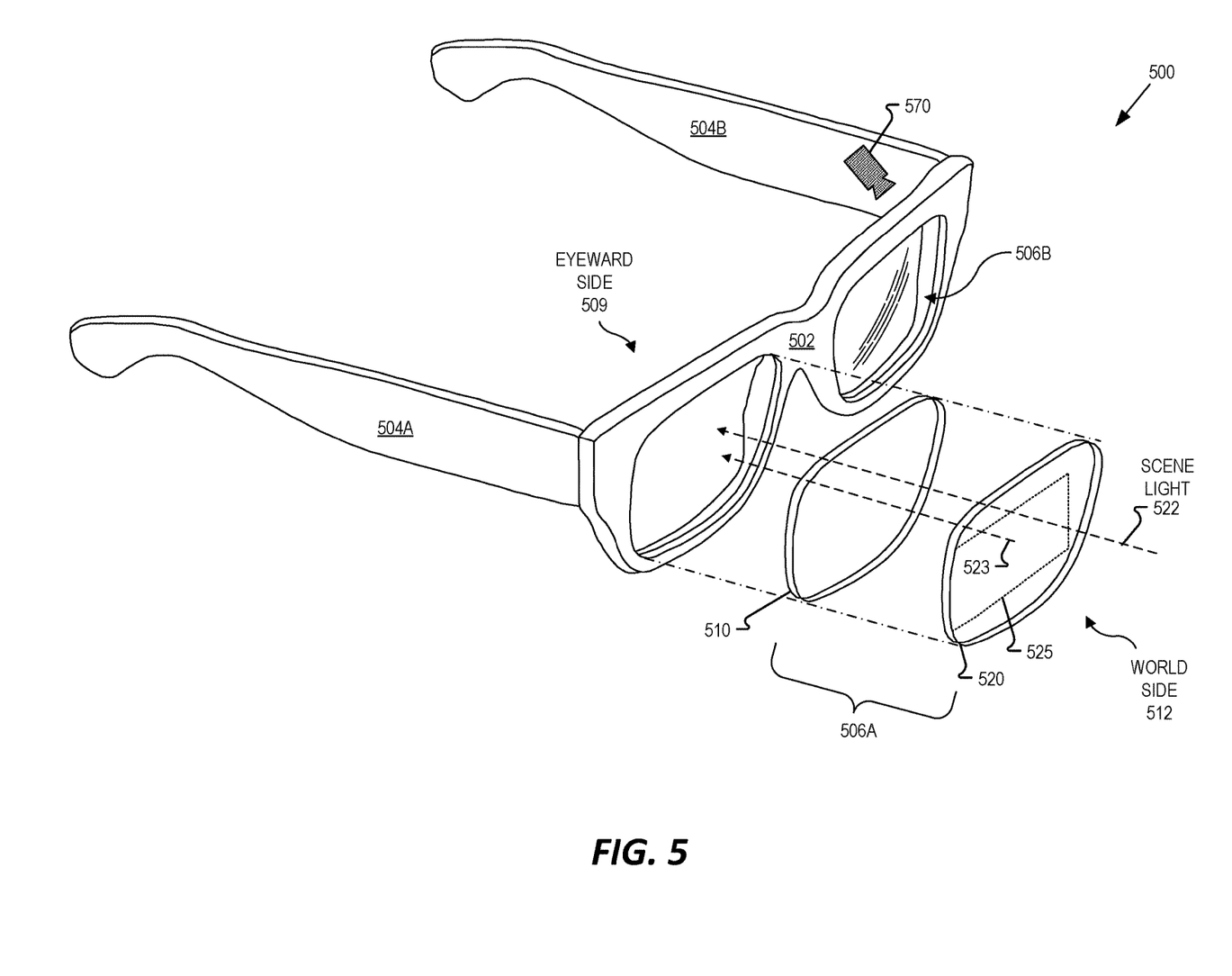
FIG. 5 illustrates an example head mounted device that includes an optical element having a linear polarizer, in accordance with aspects of the disclosure.

FIG. 5 illustrates an example head mounted device 500, in accordance with aspects of the present disclosure. The optical elements and lenses described in this disclosure may be used to provide certain components to head mounted device 500. A head mounted device, such as head mounted device 500, is one type of smart device. In some contexts, head mounted device 500 is also a head mounted display (HMD). Artificial reality is a form of reality that has been adjusted in some manner before presentation to the user, which may include, e.g., virtual reality (VR), augmented reality (AR), mixed reality (MR), hybrid reality, or some combination and/or derivative thereof.

The illustrated example of head mounted device 500 is shown as including a frame 502, temple arms 504A and 504B, and a near-eye optical element 506A and a near-eye optical element 506B. FIG. 5 also illustrates an exploded view of an example of near-eye optical element 506A. Near-eye optical element 506A is shown as including optical element 510 and a display layer 520.

As shown in FIG. 5, frame 502 is coupled to temple arms 504A and 504B for securing the head mounted device 500 to the head of a user. Example head mounted device 500 may also include supporting hardware incorporated into the frame 502 and/or temple arms 504A and 504B. The hardware of head mounted device 500 may include any of processing logic, wired and/or wireless data interfaces for sending and receiving data, graphic processors, and one or more memories for storing data and computer-executable instructions. In one example, head mounted device 500 may be configured to receive wired power and/or may be configured to be powered by one or more batteries. In addition, head mounted device 500 may be configured to receive wired and/or wireless data including video data.

FIG. 5 illustrates near-eye optical elements 506A and 506B that are configured to be mounted to the frame 502. The frame 502 may house the near-eye optical elements 506A and 506B by surrounding at least a portion of a periphery of the near-eye optical elements 506A and 506B. The near-eye optical element 506A is configured to receive visible scene light 522 at a world side 512 of the near-eye optical element 506A. The visible scene light 522 propagates through optical element 506A to an eye of a user of the head mounted device on an eyeward side 509 of optical element 506A. In some examples, near-eye optical element 506A may be transparent or semi-transparent to the user to facilitate augmented reality or mixed reality such that the user can view visible scene light 522 from the environment while also receiving display light 523 directed to their eye(s) by way of display layer 520. A waveguide 525 included in display layer 520 may be utilized to direct the display light 523 generated by an electronic display in an eyeward direction, although other display technologies may also be utilized in display layer 520. In some implementations, at least a portion of an electronic display is included in the frame 502 of the head mounted device 500. The electronic display may include an LCD, an organic light emitting diode (OLED) display, micro-LED display, pico-projector, or liquid crystal on silicon (LCOS) display for generating the display light 523.

In further examples, some or all of the near-eye optical elements 506A and 506B may be incorporated into a virtual reality headset where the transparent nature of the near-eye optical elements 506A and 506B allows the user to view an electronic display (e.g., a liquid crystal display (LCD), an organic light emitting diode (OLED) display, a micro-LED display, etc.) incorporated in the virtual reality headset. In this context, display layer 520 may be replaced by the electronic display.

Optical elements 200, 300, or 400 may be used as optical element 510, in different implementations of the disclosure. Optical element 510 may be spaced apart from display layer 520. Additional optical elements (including additional lenses) may be disposed between display layer 520 and optical element 510. Optical element 510 is configured to focus the display light 523 for a user to view images of the display light 523 from head mounted device 500.

In some implementations, camera 570 is positioned to image an eye of a user directly by imaging the reflected non-visible illumination light reflecting from the eye region. Camera 570 may include a CMOS image sensor. Camera 570 may also be positioned to image an eye of a user by receiving reflections from a combiner layer (not illustrated) of optical element 506B. Infrared light from light sources in head mounted device 500 may illuminate the eye to assist with camera 570 imaging the eye and camera 570 may include an infrared filter that receives a narrow-band infrared wavelength so it is sensitive to a narrow-band infrared wavelength emitted by the infrared light sources while rejecting wavelengths outside the narrow-band, including visible light wavelengths.

In some aspects, optical element 506A may have a thickness and/or curvature that corresponds to the specifications of a user. In other words, optical element 506A may be considered a prescription lens.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens comprising:
   a refractive lens layer including a lens surface having optical power, wherein the refractive lens layer includes an eyeward side and a backside to receive light from a display;
   a reflective polarizer layer;
   a linear polarizer layer disposed between the reflective polarizer layer and the refractive lens layer, wherein the linear polarizer layer includes surface waviness; and
   a transparent optical layer disposed over the linear polarizer layer, wherein the transparent optical layer is a plastic film having a thickness of 300 microns or more that is disposed over the backside of the refractive lens layer and configured to smooth the surface waviness of the linear polarizer layer and wherein the transparent optical layer is disposed between the linear polarizer layer and the reflective polarizer layer.

2. The lens of claim 1, wherein the surface waviness is dominantly aligned with respect to a polarization axis of the linear polarizer layer.

3. The lens of claim 1 further comprising:
   a quarter-waveplate disposed between the refractive lens layer and the linear polarizer layer.

4. The lens of claim 1, wherein the transparent optical layer contacts the reflective polarizer layer and the linear polarizer layer.

5. The lens of claim 1 further comprising:
   an optically clear adhesive disposed between the linear polarizer layer and the transparent optical layer, wherein the optically clear adhesive is index-matched to the refractive lens layer, and wherein the optically clear adhesive has a thickness that at least partially smooths the surface waviness of the linear polarizer layer.

6. The lens of claim 1, wherein the transparent optical layer is index matched to a refractive index of the refractive lens layer.

7. An optical element comprising:
a reflective layer;
a linear polarizer layer, wherein the linear polarizer layer includes surface waviness; and
a transparent optical layer disposed between the linear polarizer layer and reflective layer, wherein the transparent optical layer includes a plastic film that has a thickness of 300 microns or more configured to be disposed over a backside of a refractive lens layer to receive display light, wherein the transparent optical layer is configured to smooth the surface waviness of the linear polarizer layer.

8. The optical element of claim 7, wherein the transparent optical layer includes polycarbonate.

9. The optical element of claim 7, wherein the reflective layer is a reflective polarizer.

10. The optical element of claim 7, wherein the linear polarization layer includes a polyvinyl alcohol (PVA) linear polarizer.

11. An optical element comprising:
a quarter-waveplate;
a reflective layer; and
a direct-coated linear polarizer having self-aligning liquid crystals forming a polarization axis of the direct-coated linear polarizer, wherein the direct-coated linear polarizer is disposed between the reflective layer and the quarter-waveplate, wherein the direct-coated linear polarizer includes chromophores aligned to form linear polarization features of the polarization axis.

12. The optical element of claim 11, wherein the reflective layer is disposed on the direct-coated linear polarizer.

13. The optical element of claim 11, wherein the reflective layer is a reflective polarizer.

14. The optical element of claim 11 further comprising:
a refractive lens layer including a lens surface having optical power, wherein the quarter-waveplate is disposed between the direct-coated linear polarizer and the refractive lens layer.

* * * * *